United States Patent [19]
Theysohn

[11] 3,895,898
[45] July 22, 1975

[54] FLAT SHEET INJECTION HEAD FOR ROLLER-HEAD INSTALLATIONS

[76] Inventor: Helmuth Theysohn, Wiehbergstrasse 25 C, 3 Hannover, Germany

[22] Filed: June 14, 1973

[21] Appl. No.: 369,846

[30] Foreign Application Priority Data
June 19, 1972 Germany............................ 2229828

[52] U.S. Cl. ................. 425/325; 425/327; 425/363
[51] Int. Cl........................... B29c 15/00; B29f 3/00
[58] Field of Search ........... 425/363, 223, 224, 209, 425/101, 367, 327, 325; 259/187–192, 42

[56] References Cited
UNITED STATES PATENTS

| | | | |
|---|---|---|---|
| 2,771,637 | 11/1956 | Silvasy et al. ................... | 425/363 X |
| 3,274,645 | 9/1966 | Chase ............................. | 425/367 X |
| 3,359,597 | 12/1967 | Bainton........................... | 425/367 X |
| 3,452,128 | 6/1969 | Rains .............................. | 425/363 X |
| 3,600,747 | 8/1971 | McCarty ......................... | 425/367 X |
| 3,734,659 | 5/1973 | Harris ............................. | 425/237 |

Primary Examiner—Robert L. Spicer, Jr.
Attorney, Agent, or Firm—Robert E. Burns; Emmanuel J. Lobato; Bruce L. Adams

[57] ABSTRACT

An extruder of plastic material has a flat sheet injection head which extrudes directly between the opposed rolls of a calender which reduces the extruded sheet in thickness. The injection head is divided into two halves of which one is fixed to the calender frame while the other is carried by the extruder which is movable away from the calender for cleaning of the injection head. When the two halves of the injection head are in operative position pressure against one of the two halves is provided by a plurality of pressure elements acting between the half of the injection head carried by the extruder and a transverse supporting member of the calender. The pressure elements may be in the form of hydraulic cylinders, a hydraulic cushion or a plurality of wedges actuated by hydraulic cylinders or by movement of the extruder to closed position.

9 Claims, 5 Drawing Figures

FLAT SHEET INJECTION HEAD FOR ROLLER-HEAD INSTALLATIONS

The invention concerns a dismountable flat sheet injection head as used in roller head installations, a combination of extruder, flat sheet injection head and two roll calender. Such installations serve for making pore free webs of plastic materials (e.g. rubber or synthetic mixtures) in greater widths and in thicknesses generally between 1.5 and 18 mm.

In an installation of this kind the extruder plasticizers and conveys the compound into the flat sheet injection head by which the same is performed into a wide strip of greater thickness than the end product. Directly adjoining the exit of the flat sheet injection head is the gap or mouth of the two roll calender so that also at this point of transition any access of air and thus pore formation is practically impossible. In the calender, the plastic material is rolled into a continuous web of constant thickness and width.

After completion of the process, any material remaining in the flat sheet injection head must be removed since, if it is permitted to stay in the head, it solidifies and consequently entails the risk of cracking the injection head, calender rolls and even the extruder when the installation is started up again. Furthermore, the flat sheet injection head must also be cleaned with a change of mixture (e.g. when changing color or composition of the mixture) since thorough rinsing of the flat sheet injection head takes too much time and also results in a considerable loss of material.

To facilitate removal of material from the fish tail shaped channel of flat sheet injection heads the latter are generally divided in a horizontal plane and, in operation, are screwed together or hydraulically clamped together.

Flat sheet injection heads specifically used in roller head plants, as described, for example in German Patent Specifications Nos. 1,704,490 and 2,028,065, are designed so that one half of the head is firmly joined with the calender and the second half is firmly joined with the extruder. In operating position, the two halves are clamped together hydraulically and held in this position by means of devices mounted at the left and right of the injection head on the two calender stands. If the flat sheet injection head is to be cleaned, the clamping is released and the entire extruder together with the half of the head fastened thereon is shifted on a carriage or a roller bed hydraulically or mechanically in a horizontal direction for such a distance that the two halves of the head are completely separated from each other. The material left behind in the injection head, which in most cases adheres to the half attached to the extruder, can now be removed without much effort. In this way, the installation is ready for processing new material in a minimum of time.

It has been found, however, that with larger widths of sheets and thus also wider flat sheet injection heads the two halves of the head with this kind of clamping will bend due to pressure of the mass to such an extent that material will escape particularly at the center of the parting line.

These wider injection heads must consequently be made to resist greater bending forces. This, in turn, results in greater weights of the heads which consequently react sluggishly to temperature regulating impulses to provide the required heating or cooling. In spite of the increased bending resistance or stiffness it is necessary in most cases to use additional joining means such as screws, clamps or the like between the center and edges of the injection head. Such additional joining means not only increases the cost, but loosening of the same requires a considerable expenditure of time.

The present invention is directed to the problem of creating a flat sheet injection head for roller head installations for making very wide webs which does not have the aforementioned drawbacks and which with a minimum in weight can be cleaned as easily and quickly as smaller heads of this kind.

In accordance with the invention, means disposed on the calender engage the half of the flat sheet injection head attached to the slidable extruder at different points along its entire width and press this half toward the half attached to the calender. To obtain a very simple while very sturdy construction, it is advisable to have between the calender stands a cross beam which serves to support the means for pressing the half of the flat sheet injection head attached to the slidable extruder toward the half attached to the calender.

The said problem is thus solved in the following manner. Between the stands of the two roll calender of the roller head unit between which the fixed half of the flat sheet injection head is fastened in known manner, there is provided a cross traverse which is rigidly joined with the calender stands and which serves as support for the movable half of the injection head. This cross traverse is provided with hydraulically or mechanically actuated pressure elements which, on the one hand, serve to equalize the play between the flat sheet injection head and the traverse. On the other hand, the pressure elements provide the pressures which are required to overcome the bending forces that result as a consequence of the pressure of the mass in the flat sheet injection head.

Since substantially different parting forces result by reason of the particular fish tail inner contour and the pressure of the mass in the flat sheet injection head decreasing toward the lateral edges, the various pressure elements can be adapted to provide correspondingly different forces.

In another embodiment of the invention the cross traverse and the movable half of the flat sheet injection head are provided with several individually adjustable wedge surfaces. The necessary pressure in a vertical direction is provided by the sliding force acting in a horizontal direction which moves the extruder with the thereon attached movable flat sheet injection head portion in a direction toward the two roll calender. Wedge surface angles and sliding forces are so matched to each other that at each point of the flat sheet injection head an adequate closing pressure is achieved.

The nature, objects and advantages of the invention will be more fully understood from the following description of preferred embodiments shown by way of example in the accompanying drawings in which.

Figure 1:
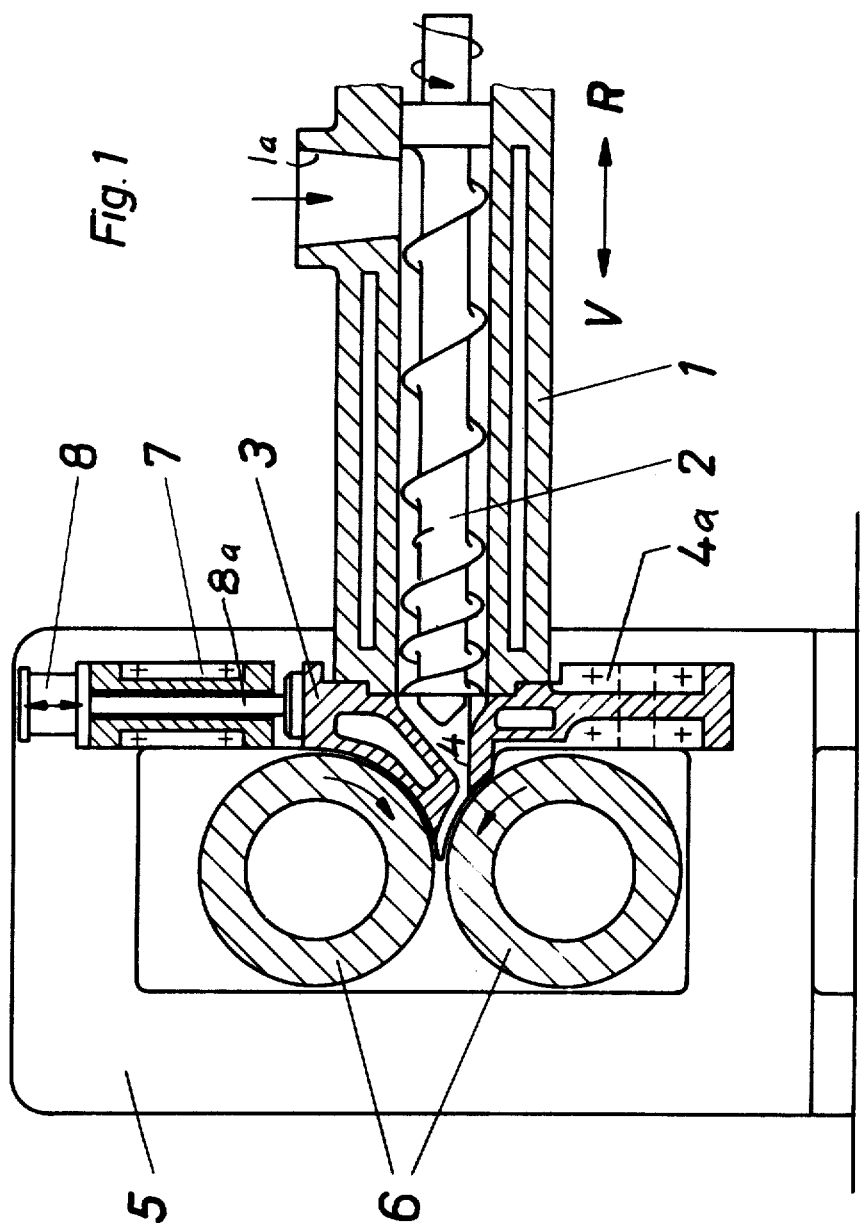
FIG. 1 is a cross section of a roller head installation in accordance with the present invention, only the rear calender stand being visible.
Figure 2:
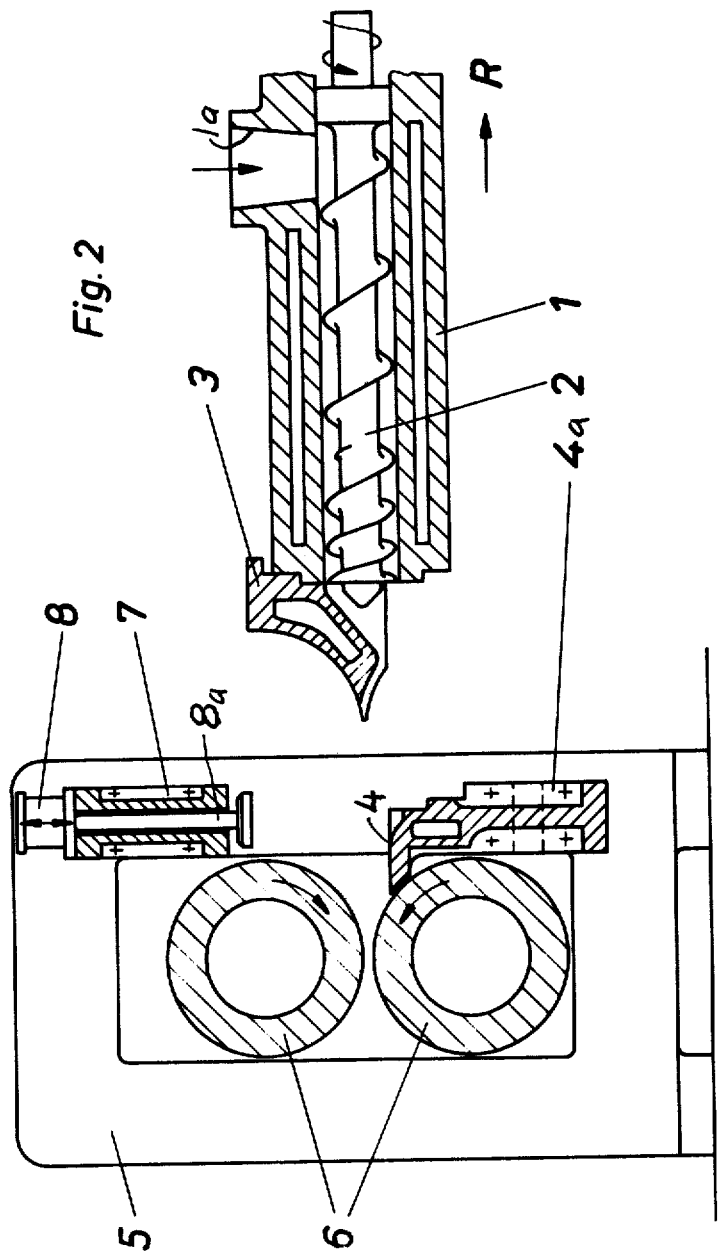
FIG. 2 is a cross section of the same installation with the extruder withdrawn and the two halves of the injection head separated.

Referring first to FIGS. 1 and 2, there is shown an extruder having a barrel or cylinder 1 and a screw or worm 2 rotatably mounted in the cylinder. The material to be extruded is fed into the cylinder through a hopper 1a. The extruder has a flat sheet injection head which is divided along a horizontal parting line into two halves. The upper half 3 is rigidly joined to the barrel of the extruder. The lower half 4 of the injection head is immovably mounted on a cross beam 4a extending between the stands 5 of a calender shown as comprising two opposed calender rolls 6 rotatably supported by the stands and suitably driven in the direction indicated by the arrows. The distance between the rolls 6 can be regulated so as to control the thickness of the sheet being produced. The two halves of the injection head are shaped as shown so as to extrude material directly into the nip between the two rolls 6 of the calender.

The extruder including the upper half 3 of the injection head is mounted for movement in a direction perpendicular to the calender rolls between an operative position as shown in FIG. 1 and a withdrawn position as shown in FIG. 2. A hydraulic cylinder or other suitable means is provided for moving the extruder between these positions, as indicated by the arrows V and R.

In accordance with the present invention, means is provided for engaging the upper half 3 of the injection head at selected points throughout its width so as to press it down toward the lower half 4 when this half is in its operative position. As illustrated in FIGS. 1 and 2, the pressure applying means comprises a plurality of hydraulic cylinders 8 mounted on a sturdy cross beam 7 which extends between the two calender stands 5 and is of sufficient strength to resist the parting forces tending to distort the head 3, 4 produced by the pressure of the mass being extruded. Each of the hydraulic cylinders 8 has a piston 8a which engages and is adapted to press downwardly on the upper face of the upper half 3 of the injection head. A suitable hydraulic system (not shown) is provided for supplying pressure fluid to all of the hydraulic cylinders 8 simultaneously in order to actuate all of the pistons 8a. As the parting forces between the two halves of the injection head may vary across the width of the head being generally greater at the center, the hydraulic cylinders 8 are preferably of different cross sectional size or are spaced from one another at different distances so as to match the variation in the parting forces.

When the injection head is to be cleaned, the pressure of the hydraulic cylinders 8 is relieved and the extruder including the upper half 3 of the injection head is moved away from the calender to the position shown in FIG. 2. Both halves of the injection head are thereby made accessible for cleaning. When the installation is again to be used, the extruder is moved back to the position shown in FIG. 1 and is pressed against the stationary lower half 4 of the injection head with sealing pressure. Pressure fluid is thereupon supplied simultaneously to all of the hydraulic cylinders 8 so as to press the upper half 3 of the injection head toward the lower half 4 throughout the width of the head.

Figure 3:
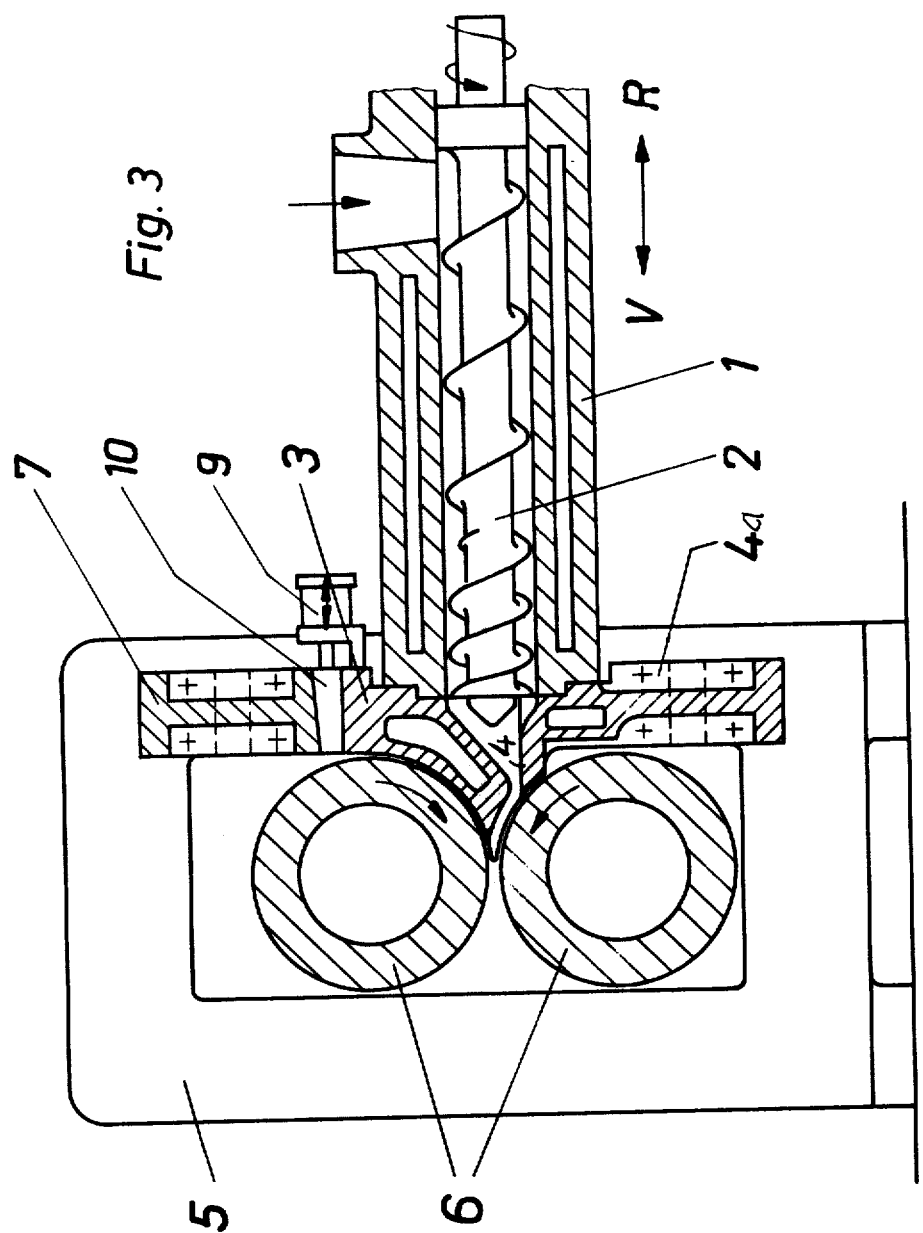
FIGS. 3, 4 and 5 are cross sections similar to FIG. 1 but showing other embodiments of the invention.

In FIG. 3 there is shown another embodiment of the invention which is like that shown in FIGS. 1 and 2 except that the means for applying pressure to the upper half 3 of the injection head to counteract bending from the proper the parting line of the divided head comprises a plurality of hydraulic cylinders 9 which are disposed with their axes horizontal and which act on wedges 10 provided between the lower face of the supporting cross beam 7 and the upper face of the upper half 3 of the injection head. By reason of the force multiplying effect of the wedges, the required high contact pressure can be achieved with hydraulic cylinders which are smaller or operate at lower pressures. Here again the spacing or size of the hydraulic cylinders can be selected to provide the pressure required at different points along the width of the injection head.

Figure 4:
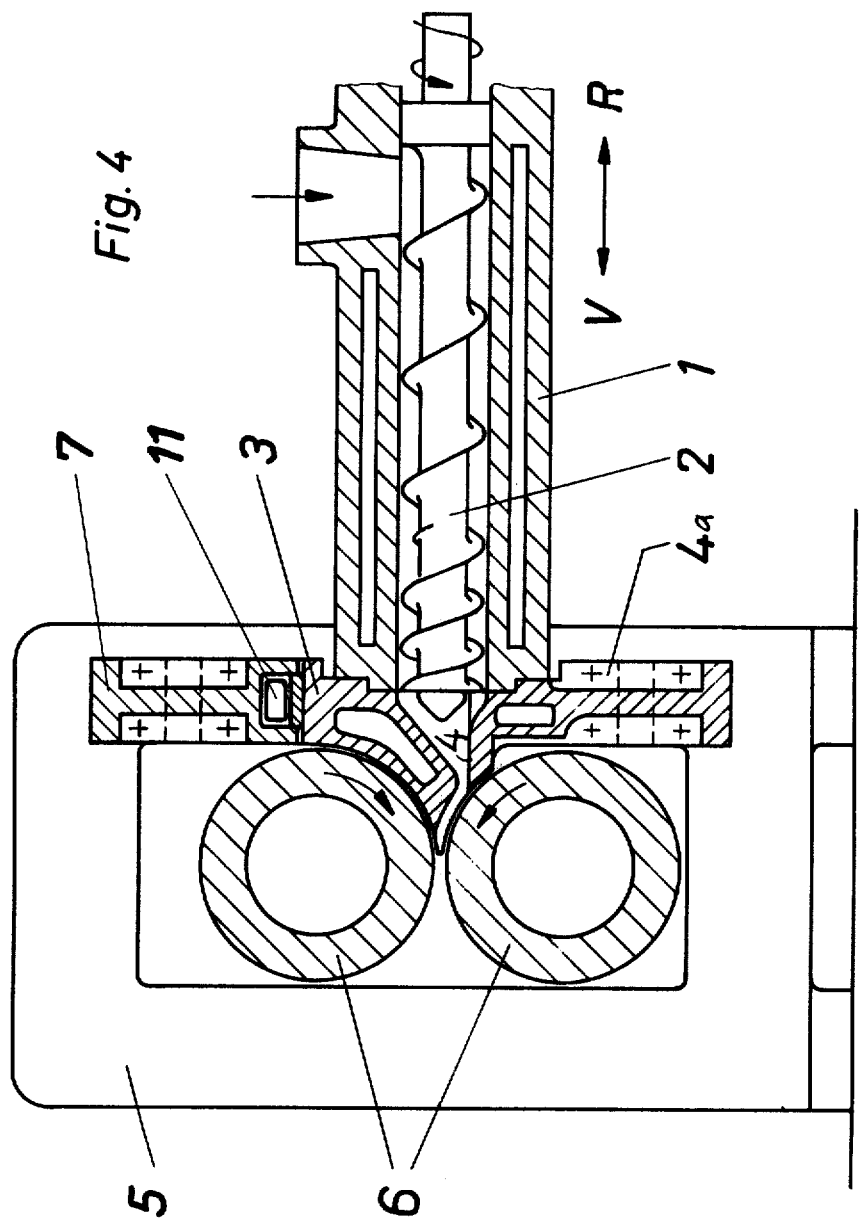

In the embodiment shown in FIG. 4 the pressure applying means comprises a hydraulic cushion 11 disposed in a recess in the lower face of the cross beam 7 and acting against the upper face of the upper half 3 of the injection head. The hydraulic cushion 11 extends over the whole width of the head. In order to provide different pressures corresponding to different parting forces occurring along the width of the injection head the hydraulic cushion 11, instead of being of uniform cross sectional size, can be tapered, for example with a wider portion at the middle and narrower portions at the ends. Alternatively, the hydraulic cushion can be divided into a plurality of separate sections which are supplied with hydraulic fluid at different pressures.

Figure 5:
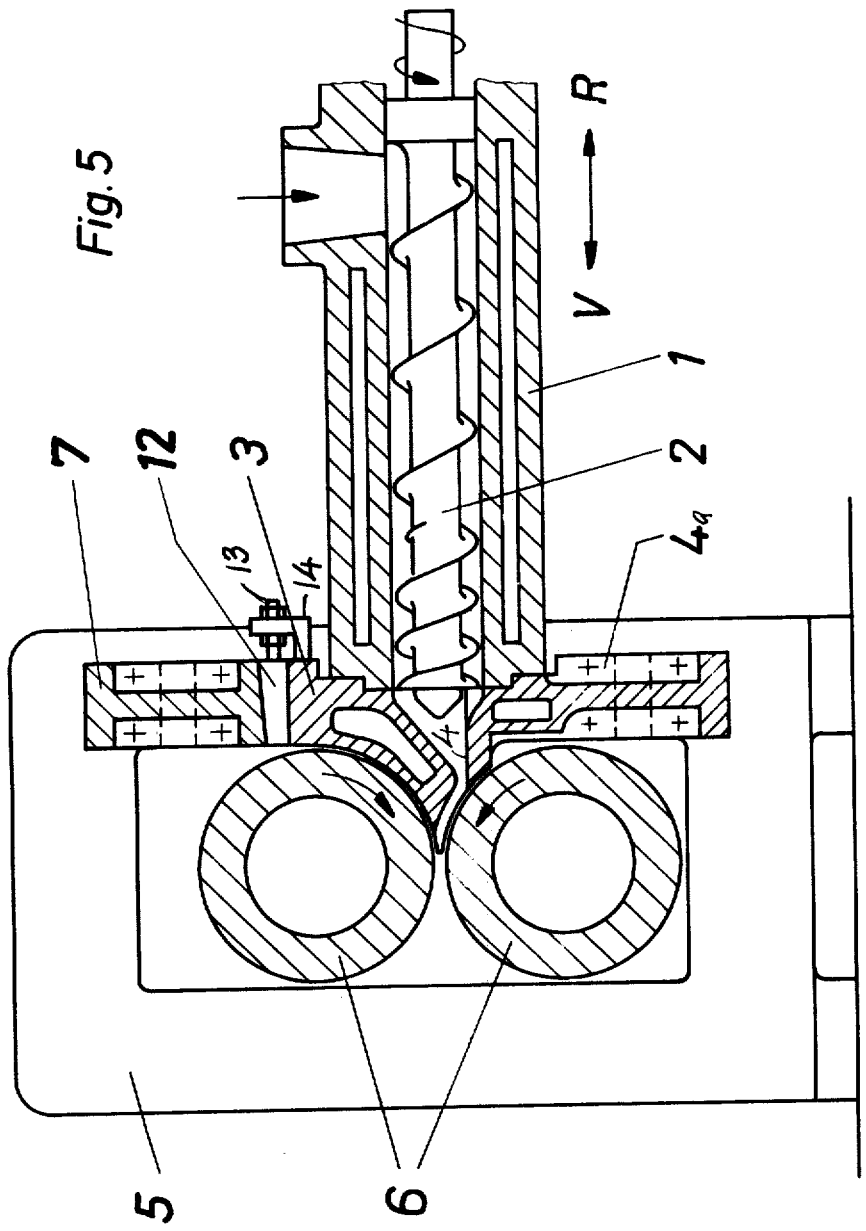

In the embodiment shown in FIG. 5 the application of pressure to the upper half of the injection head is effected by the movement of the extruder itself toward the calender so that no additional clamping means are required. This pressure is provided by a plurality of wedges 12 disposed between the lower face of the cross beam 7 and the upper face of the upper half 3 of the injection head. When the extruder is moved against the calender, the wedges 12 are pushed inwardly by adjustable stud bolts 13 on brackets 14 fixed to the upper half 3 of the injection head which in turn is carried by the extruder cylinder 1. The bolts 13 are adjusted so as to press each of the wedges 12 inwardly to provide the required pressure. As in the case of the embodiment illustrated in FIGS. 1 and 2, the extruder shown in FIG. 5 is movable between an withdrawn position as illustrated in FIG. 2 and an operative position as illustrated in FIG. 1. When the extruder is moved to the latter position as shown in FIG. 5 the adjustable bolts 13 engage the respective wedges 12 to force them inwardly and thereby apply pressure to the upper half 3 of the injection head so as to counteract the bending forces. The bolts 13 are adjusted by means of nuts on opposite sides of the brackets 14 so as to provide the required pressure at each point throughout the width of the head. The spacing of the wedges 12 from one another may also be varied if desired according to the distribution of the required pressure. When moving the extruder back to the cleaning position shown in FIG. 2 the pressure on the wedges 12 is relieved, thereby relieving the vertical pressure exerted by the wedges on the upper half 3 of the injection head.

While preferred embodiments of the invention have been illustrated in the drawings and are herein particularly described it will be recognized by those skilled in the art that many modifications can be made and that the invention is in no way limited to the illustrated embodiments.

What I claim and desire to secure by Letters Patent is:

1. Roller head apparatus comprising;
   a calender stand; calender rolls rotatably supported by said stand and defining a nip between the rolls;

an extruder barrel; an extruder screw rotatable therein for the extruding of material in a plastic state from said barrel;

an elongate injection head for said barrel aligned with said nip, said injection head defining an elongate flat sheet extruder nozzle for said extruding of material and comprising two elongate parts generally disposed on opposite elongate sides of said elongate flat sheet extruder nozzle;

rigid means mounted on said calender stand and extending along said elongate injection head;

means supporting a first of said elongate parts of said injection head mounted stationary on said rigid means, the other of said elongate parts of the injection head being mounted on said barrel and being movable therewith toward and away from said calender stand and rolls; and pressure means mounted on said rigid means for acting between the same and said movable elongate part of the injection head for releasably pressing this part toward said stationary elongate part, in portions of said parts including at least a central portion thereof, to counteract distortion of said movable elongate part in the use of the apparatus.

2. Calender apparatus, comprising;

a calender stand; calender rolls rotatably supported by the stand and defining a nip between the rolls;

an extruder barrel; an extruder screw rotatable therein for extruding material in a plastic state from the barrel;

a flat sheet extruder head defining an extruder aperture elongate transversely of said barrel, the head being disposed in use for extruding material in a plastic state from the barrel through the elongate aperture into the nip between the calender rolls, the extruder head comprising first and second, similarly elongate parts generally disposed on mutually opposite, elongate sides of said aperture;

rigid stationary means mounted on said stand, extending along said elongate extruder head, and rigidly stationarily supporting the first elongate part of said extruder head, the second elongate part of said extruder head being mounted on said barrel and being mounted for movement therewith toward and away from said rigid stationary means; and pressure means mounted on said rigid means and actuatable between said rigid means and said second elongate movable elongate part for releasably pressing at least a central portion of said second elongate movable part toward said first elongate part to counteract distortion of the second elongate movable part in the use of the extruder.

3. Apparatus according to claim 2 wherein said rigid means mounted on said stand comprises first and second parallel beams spaced apart across said extruder head and each extending along said extruder head, the first beam supporting said first elongate part and the second beam supporting said pressure means.

4. Apparatus according to claim 3 in which the barrel and the second elongate movable part of the extruder head mounted thereon are disposed for movement to and away from said second beam and pressure means, the latter means being actuatable by the movement of said second elongate movable part to said rigid stationary means.

5. Apparatus according to claim 4 in which the pressure means comprises a plurality of wedge means distributed along said extruder head and actuatable to act between said rigid means and said elongate movable part of the extruder head, and means for actuating the wedge means.

6. Apparatus according to claim 5 in which the means for actuating the wedge means comprises fluid pressure actuatable piston means mounted on said rigid means.

7. Apparatus according to claim 2 in which the pressure means comprises a plurality of fluid pressure actuatable piston means mounted on said rigid means and actuatable to act between said rigid means and said elongate movable part of the extruder head.

8. Apparatus according to claim 2 in which the pressure means comprises a fluid pressure cushion for acting between said rigid means and said elongate movable part of the extruder head.

9. Apparatus according to claim 2 in which the pressure means comprises a plurality of pressure elements disposed at selected points along the elongate movable part of the extruder head for applying locally different pressures to said part.

* * * * *